United States Patent
Lamp et al.

(10) Patent No.: US 6,919,097 B2
(45) Date of Patent: Jul. 19, 2005

(54) SOFT, FULLY BAKED BREADSTICKS

(75) Inventors: Mary A. Lamp, Fitchburg, WI (US); Keith Forneck, Hanover Park, IL (US)

(73) Assignee: Kraft Food Holdings, Inc., Northfield, IL (US)

( * ) Notice: Subject to any disclaimer, the term of this patent is extended or adjusted under 35 U.S.C. 154(b) by 17 days.

(21) Appl. No.: 10/042,983

(22) Filed: Jan. 8, 2002

(65) Prior Publication Data

US 2002/0146490 A1 Oct. 10, 2002

Related U.S. Application Data

(63) Continuation-in-part of application No. 09/573,019, filed on May 17, 2000, now abandoned.
(60) Provisional application No. 60/134,570, filed on May 17, 1999.

(51) Int. Cl.$^7$ .............................................. B65D 85/00
(52) U.S. Cl. ........................... 426/120; 426/76; 426/94; 426/128; 426/496; 426/549
(58) Field of Search ........................ 426/128, 94, 120, 426/138, 76, 496, 549

(56) References Cited

U.S. PATENT DOCUMENTS

| | | |
|---|---|---|
| 969,173 A | 9/1910 | Loose |
| 2,169,278 A | 8/1939 | Otting |
| 3,072,488 A | 1/1963 | Watts et al. |
| 3,100,153 A | 8/1963 | Knight |
| 4,133,895 A | 1/1979 | Kosikowski et al. |
| 4,675,193 A | 6/1987 | Boudreaux |
| 4,708,876 A | 11/1987 | Yokoyama et al. |
| 4,752,483 A | 6/1988 | Hagberg et al. |
| 5,045,329 A | 9/1991 | Goglanian et al. |
| 5,167,973 A | * 12/1992 | Snyder .......................... 426/115 |
| 5,211,972 A | 5/1993 | Kratky et al. |
| 5,260,075 A | * 11/1993 | Haegens et al. ............... 426/19 |
| 5,695,798 A | * 12/1997 | Rozzano ....................... 426/115 |
| 5,747,084 A | 5/1998 | Cochran et al. |
| 5,792,499 A | 8/1998 | Atwell |
| 6,048,558 A | 4/2000 | Feldmeier et al. |

OTHER PUBLICATIONS

Baking Science & Technology, 3$^{rd}$ Edition, Author: E.J. Pyler—1988, pp. 485–486 Encyclopedia of Chemical Technology, 4$^{th}$ Edition, vol. 3 Antibiotics to Batteries Authors: Kirk–Othmer 1992, pp. 881–882.

* cited by examiner

Primary Examiner—Lien Tran
(74) Attorney, Agent, or Firm—Fitch, Even, Tabin & Flannery

(57) ABSTRACT

A fully baked, soft, breadstick product is provided having a water activity in the range of about 0.9 to 0.95. The breadstick product is ideally suited for use in a refrigerated, ready-to-eat kit. The breadstick products are of a convenient size and shape with perforations to allow the breadstick product to be separated into individual breadsticks. The breadstick product is especially adapted as a single serving or snack food product. Also provided is a kit containing the breadstick product with one or more additional food items. Such additional food items include, for example, cheese, cheese products, cheese sauces, tomato sauces, cream cheese, butter, margarine, jam, jelly, honey, peanut butter, olive oil, salad ingredients, salad dressings, and the like. Preferably, each component item is in a separate container sealed from the other food items to substantially retard or prevent flavor, moisture, and microbial migration from one food item to another. The breadstick products retain a soft, desirable texture throughout their anticipated shelf lives.

15 Claims, 3 Drawing Sheets

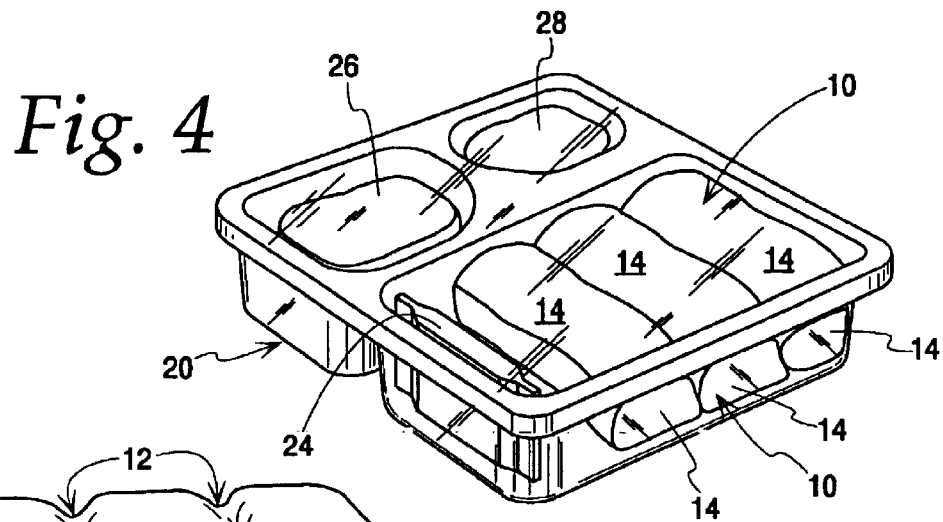
*Fig. 4*
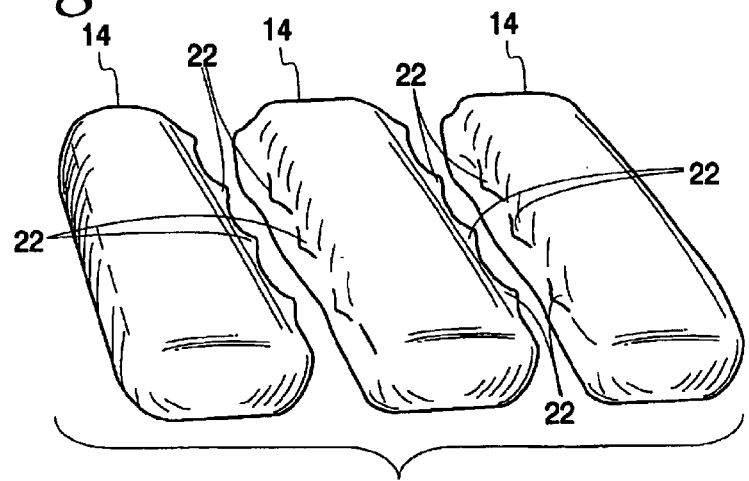
*Fig. 1*
*Fig. 2*
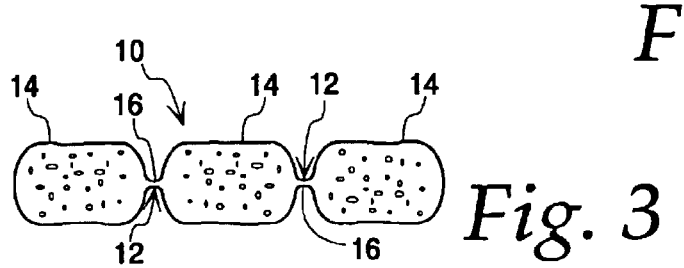
*Fig. 3*

SOFT, FULLY BAKED BREADSTICKS

RELATED APPLICATION

This application is a continuation-in-part application of U.S. application Ser. No. 09/573,019, filed on May 17, 2000, now abandoned which was based on, and claimed benefit of, U.S. Provisional Application Serial No. 60/134,570, filed May 17, 1999.

FIELD OF THE INVENTION

This invention relates to a breadstick food product which is suitable for use in snack-type packages. In particular, the invention relates to a fully baked breadstick food product which retains its soft texture when stored at refrigeration temperatures. The breadsticks of this invention are especially adapted for use in cartons and/or packages which also contain the other food products which can serve as a snack or other ready-to-eat lunch product.

BACKGROUND OF THE INVENTION

Convenience foods (i.e., products which require a minimum amount of consumer preparation and are quick to prepare) are in high demand to accommodate today's busy lifestyles. Examples range from cheese and cracker snacks and canned stews to refrigerated bagels and some frozen dinners. Typically, such products will be eaten as packaged or after a brief heating period, preferably by microwave heating. Notably absent from this category are bread products.

Baked bread products are normally available as freshly prepared products that are intended to be consumed within a relatively short time period or as frozen products which can be stored in the frozen state for relatively long periods of time. Such frozen bread products, once thawed, generally must also be consumed within a relatively short time period. Baked bread products are generally not sold as refrigerated products. Once a fully baked bread product has been refrigerated, it tends to "toughen" or become leathery, stale, and/or dry. See, for example, David, English Bread and Yeast Cookery, American Edition, p. 255 (Viking Press, New York 1977). When such a bread product becomes "leathery" (a term of art), it becomes harder to chew and loses its "chewability."

Reheating such a leathery bread product does not generally restore the bread's texture and may, in fact, further "toughen" it to form an even more leathery texture. Thus, while such a leathery bread product may be fully edible from all health and safety considerations, the consumer's enjoyment obtained from such a reheated product is generally less, often significantly less, than that experienced when the bread product was fresh; much of the loss of quality is due to the bread product becoming increasingly more leathery. Thus, fully baked bread products are not often found in grocery refrigerator cases.

Feldmeir et al., U.S. Pat. No. 6,048,558, provided a meal kit containing a baked bread or dough product in a sealed pouch which is contained within a compartment contained within a base tray having an anti-fogging agent component. The anti-fogging agent assists in maintaining freshness and retarding staling under refrigerated, non-frozen conditions. Generally the anti-fogging agent is contained within a layer of the base trap or in other container elements so that enters the compartment in a time release manner so that it gradually blooms onto the internal surfaces within the meal kit. The anti-fogging agent is though to prevent the formation of water droplets within the container and thereby allow any trapped moisture to more easily evaporate from the meal kit.

There is a need for a bread product which can be baked, refrigerated, and subsequently eaten cold, warm, or hot (i.e., reheated) without further baking and without becoming leathery, and which retains the desired textural and taste properties. Moreover, there is a need for a fully baked bread product which can be used in a kit format and which retains its soft texture throughout the expected shelf life of the kit and remains tasty and chewable when eaten hot or cold. There further exists a need for a ready-to-eat bread product and kit containing a ready-to-eat bread product which can be refrigerated without the bread product becoming leathery, dry, and/or stale; and which remains equally tasty and satisfactorily chewable either hot or cold. There further exists a need for a ready-to-eat bread product and kit containing a ready-to-eat bread product which can be refrigerated without the bread product becoming leathery, dry, and/or stale; and which remains equally tasty and satisfactorily chewable either hot or cold and which does not require the use of an anti-fogging agent. It is generally preferred that the ready-to-eat bread product be provided as part of a kit containing other food products which can be consumed and enjoyed with the bread product.

The present invention provides such fully baked, ready-to-eat bread products and kits containing such bread products in combination with other complementary and associated food products. More particularly, the present invention provides fully baked, ready-to-eat breadstick products and kits containing such breadstick products in combination with other complementary and associated food products. The breadstick products of this invention can be eaten as is or after heating.

SUMMARY OF THE INVENTION

The invention comprises a farinaceous product, preferably a breadstick product, which can be baked, refrigerated and served cold or reheated without becoming leathery, dry, stale and/or tough. Generally, the farinaceous product will have a water activity in the range about 0.9 to about 0.95 and will retain satisfactory texture and chewability characteristics throughout its shelf life. The farinaceous product of this invention is especially adapted for use in a "single-serving" kit which provides the farinaceous product along with other snack or lunch-type food products or components. Such a kit will preferably contain (1) one or more fully baked, breadstick products having a water activity in the range of about 0.9 to about 0.95, which retains its texture and chewability characteristics upon refrigeration and (if desired) upon heating just prior to consumption, and (2) additional components which complement and for enhance the breadstick products. Preferably, the breadstick product is in the form of two or more breadstick-shaped bread products which are attached to each other in a perforated manner so as to be easily separated to provide individual breadsticks. Such additional products include, for example, pizza sauce, cheese, cheese products, cheese sauces, cream cheese, butter, margarine, jam, jelly, honey, peanut butter, olive oil, salad ingredients, salad dressings, proteinaceous products such as pepperoni or other meat products, and the like. Of course, other additional products, including both food and non-food items, can be included in the kit. Preferably, such a kit is contained in a single serve package having separate compartments and/or pouches for the various ingredients. The pouches preferably are sealed under an inert atmosphere to increase the shelf life of the product or kit. The breadstick products and meal kits containing the breadstick products of the present invention do not require the use of an anti-fogging agent to achieve the desired shelf life. In an especially preferred kit, the breadstick product itself comprises at least two, and even more preferably, only two, integral and fully baked bread products wherein each fully baked bread product can be easily separated along perforations baked into the fully baked bread product in order to form two or more, and more preferably, only three, breadstick-shaped products. The breadstick product may be consumed as a loaf type bread product (i.e., in its unseparated form) or as individual breadsticks (i.e., in its separated form). Moreover, the breadstick product may be consumed directly from the package with or without further heating as desired by the consumer.

BRIEF DESCRIPTION OF THE DRAWINGS

FIG. 1 is a perspective view of a breadstick product of the present invention.

FIG. 2 is a perspective view of a breadstick product of the present invention wherein the individual breadstick units have been separated along the perforated connectors.

FIG. 3 is a cross sectional view of the breadstick product of FIG. 1.

FIG. 4 is a perspective view of a first kit comprising a tray containing a breadstick product and additional food components.

DETAILED DESCRIPTION OF PREFERRED EMBODIMENTS

Figure 5A:
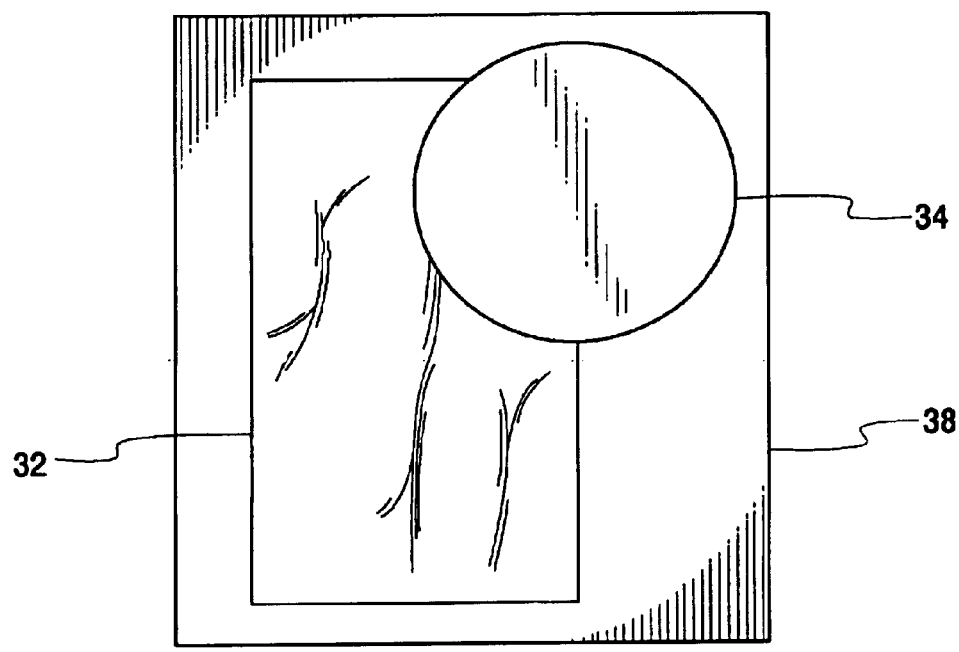
FIGS. 5a and 5b are schematic plan views of respective top and bottom layers of a second kit comprising a tray containing a breadstick product and additional food components.
Figure 5B:
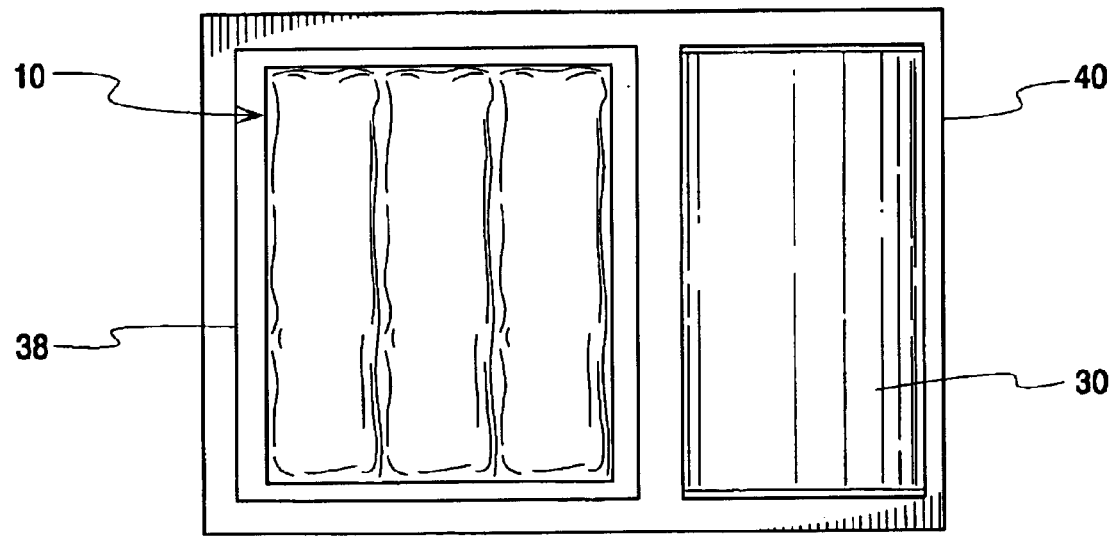
Figure 6:
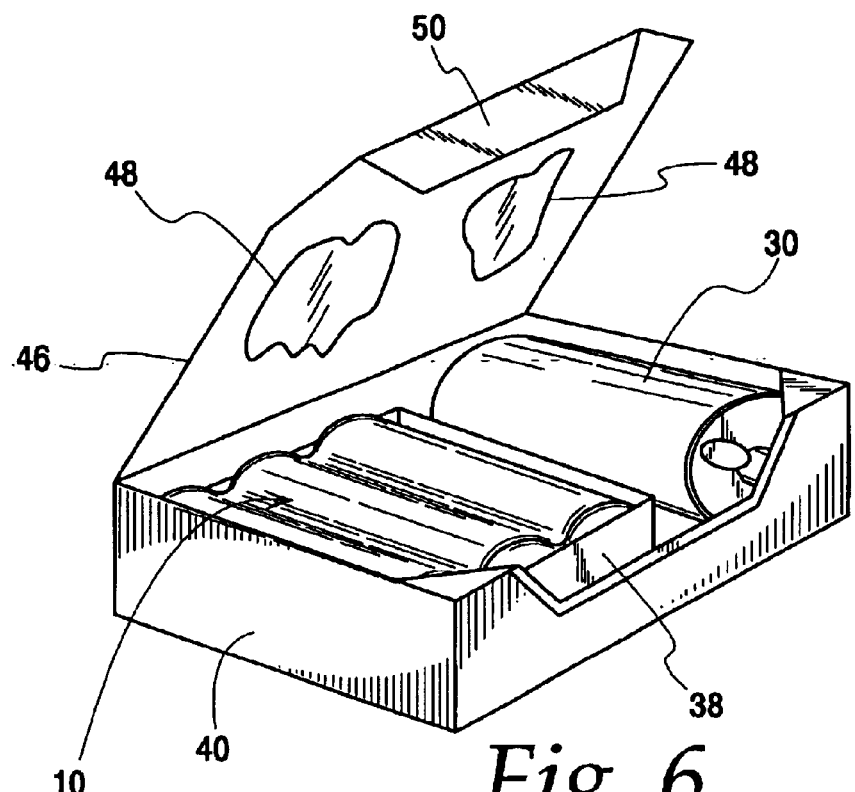
FIG. 6 is a perspective view of the kit of FIGS. 5a and 5b.

The invention comprises a fully baked bread product which can be refrigerated and which retains its desirable soft texture for the shelf life of the product. The invention further comprises a kit containing a fully baked bread product and one or more additional food products which can be enjoyably consumed with the bread product. Neither the fully baked bread product nor the packaging materials including in the kit require an anti-fogging agent to achieve the desired characteristics of the refrigerated product. Thus, neither the fully baked bread product nor the packaging materials including in the kit contain such an anti-fogging agent. In an especially preferred embodiment, the bread product has the overall form of a single loaf with perforations which allow the loaf to be separated into individual breadstick components. In another preferred embodiment, the invention comprises a fully baked breadstick product which can be refrigerated without development of a leathery texture when eaten cold or reheated and which will retain a soft texture for extended periods of time. In other preferred embodiments, the fully baked, breadstick product can be easily separated into individual breadsticks and are included in a tray-type package with additional components which are storable at refrigerated temperatures and from which one may assemble a ready-to-eat snack or lunch. Moreover, the fully baked, breadstick products of this invention retain their desirable soft texture throughout the entire shelf life of the products e.g., about 3 months or even longer while maintained at refrigerated temperatures.

A preferred fully baked breadstick product 10 is illustrated in FIG. 1 (perspective view), FIG. 2 (perspective view illustrating the separation of the individual breadsticks), and FIG. 3 (cross sectional view of the FIG. 1 product). Although the breadstick product 10 is illustrated as being essentially loaf shaped and with two perforations, other basic shapes and numbers of perforations can be used if desired. Although the kits may contain one or more of the breadstick products, it is generally preferred that a kit designed for consumption by an individual contain two such breadstick products and, therefore, a total of six individual breadsticks. The general or basic loaf shape as shown in FIG. 1 will generally be more easily packaged in the kits contemplated by this invention. Moreover, the general or basic loaf shape is expected to be more appealing to the consumer since it will resemble freshly baked bread. As shown in FIG. 1, the breadstick product 10 has a general loaf shape with two perforation lines or portions 12. The perforations 12 allow the breadstick product to be easily separated into individual breadsticks 14. Using two perforation lines or sections 12, three individual breadsticks 14 can be obtained. Each perforation line preferably comprises a plurality of frangible connecting segments 16 separated by spaces. The fractured segments are indicated at 22 in FIG. 2.

Preferably, the breadstick product 10 is about 3.5 to about 6.0 inches long, about 2.5 to about 5 inches wide, and about 0.5 to 1.0 inches thick. Of course, as those skilled in the art will realize, the overall dimensions can be smaller or larger than the ranges just presented. Preferably, the breadstick product 10 will have at least one perforation line or section 12. The individual breadsticks 14 preferably are about 3.5 to about 6.0 inches long, about 0.5 to about 1.75 inches wide, and about 0.5 to about 1.0 inches thick.

The perforation lines 12 are preferably formed using die cutters. Alternatively, they may be formed by baking the dough in individual molds or baking the individual "rolls" of dough in closely spaced condition so that the perforations are formed during baking. Thus, the perforation lines 12 are formed from the same dough as used to bake the breadstick product; in other words, the thinned baked bread between the individual breadsticks forms the perforations and is edible as well. The perforations 12 can be an essentially continuous thickness of baked dough so that they can be easily separated by hand or may be in the form on two or more sections of baked dough spanning the space between the individual breadstick. In other words, the perforations 12 can having alternating sections of baked dough and sections which are essentially empty space (i.e., similar to a dashed line). The dough sections along the perforations (whether one continuous section or multiple sections of dough) are preferably about ⅛ to about ½ inches thick to allow the individual breadsticks to be separated. An especially preferred loaf would be about 4 to about 4.5 inches long, about 3.5 to 4.0 inches wide, and about 0.7 to 0.8 inches thick, with two perforations and yielding three individual breadsticks of about 4 to 4.5 inches long, about 1.2 to about 1.5 inches wide, and about 0.7 to about 0.8 inches thick. In other embodiments, the dimensions of the breadstick product and the individual separated breadsticks can be varied.

FIG. 4 illustrates a first kit containing two fully baked breadstick products 10 in a tray-like container 20 with additional and separate packages of condiments or other food products to be consumed with the breadstick product. The container of FIG. 4 contains three separate, sealed compartments. The breadstick products 10 are stacked in a single large compartment with a separate food component 24 in a separate container. Other food components 26 and 28 are disposed in separate compartments of the container 20. Such other food components can include, for example, a pizza sauce or other tomato-based sauce, other sauces, meat product or other protein source, cheese, cheese products, cheese sauces, cream cheese, butter, margarine, jam, jelly, honey, peanut butter, olive oil, salad ingredients, salad dressings, and the like. Of course, other additional products, including both food and non-food items, can be included in the kit. The kit shown in FIG. 4 contains at least two additional associated food products. Preferably, the kit is contained in a single-serve package having separate compartments and/or pouches for the various ingredients, including the breadstick product, which are sealed under an inert atmosphere to increase the shelf life of the product or kit.

Each food component is preferably packaged in a pouch, envelope or the like, under inert gas and/or inert gas flushed conditions. Such separate packages can be formed from plastic film (e.g., pouches), paper, metal foil, or laminates containing two or more of these materials and/or using compartments formed in the tray 20 which are then sealed with a cover. Preferably, the components are sealed under an inert atmosphere or under inert gas flushed conditions. Each compartment or container is preferably sealed hermetically, using at least one layer of an oxygen-barrier material. However, if desired, non-hermetic sealing may be employed where extended shelf life is not required. The materials employed for the containers may include oxygen-impermeable materials, water barrier layers, etc. as desired.

FIGS. 5a–7 illustrate a second kit embodying the invention, wherein each of the food components is contained in a separate sealed pouch, with the various pouches being arranged in layers in a carrier 38. The carrier is contained within a carton 40 having a hinged top lid and a front opening.

Arranged in the carton are a plurality of food components comprising, in the illustrated embodiment, a soft drink container 30, e.g., a 12 oz can of juice, carbonated beverage, or the like, disposed on one side of the carton, and two layers of food products disposed on the other side. The bottom layer comprises a pouch filled with shredded cheese 32, preferably mozzarella cheese, and a container of pizza sauce 34. The container for the pizza sauce may be a cup having a removable lid, or may comprise a hermetically sealed pouch, for example.

The second layer comprises a product, preferably a pair of stacked breadstick loafs 10, as described above, disposed within a sealed pouch 36. The pouch 36 comprises a bottom wall 54 defining a cavity for receiving the product 10, and a top wall 52 peripherally sealed thereto with a peelable hermetic seal. The edges of the top and bottom walls 52 and 54 are separated at one or more corners 56 to facilitate opening.

The carrier 38 preferably comprises a generally rectangular paperboard structure having a generally rectangular bottom wall and a plurality of upstanding side walls that may extend generally vertically upward from the bottom wall, or may be angled outward to permit nesting of the carrier with other like carriers.

Figure 7:
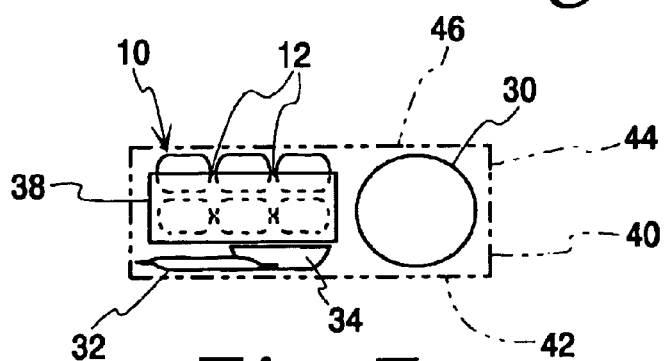
FIG. 7 is a schematic elevation of the kit of FIGS. 5a and 5b.
Figure 8:
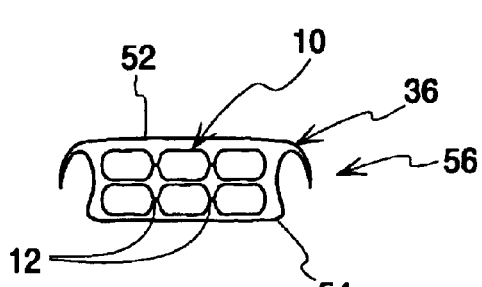
FIG. 8 is a schematic elevation of the breadstick product in a pouch.

FIG. 7 illustrates a carrier 38 with food components 32 and 34 positioned therebeneath. In other embodiments, the food components 32 and 34 may be placed within the carrier, beneath the breadsticks.

Figure 9:
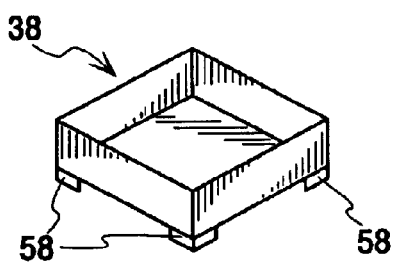
FIG. 9 is a perspective view of a carrier for use in a kit in accordance with certain embodiments of the invention.

The carrier may, if desired, have feet 58 to space its bottom wall from that of the carton 40 (see, e.g., FIG. 9).

The carrier is preferably disposed within an outer carton 40 having a generally parallelepiped shape, comprising a generally rectangular bottom wall, with generally rectangular upstanding side walls 44. The outer carton preferably has a hinged lid 46 with windows 48 and a front flap 50 to permit reclosing, and may include conventional easy open features.

Each of the seals of the pouches is preferably capable of withstanding the stresses and strains associated with shipping and handling, including atmospheric pressure drops, which may occur due, e.g., to transportation from a packaging facility at an elevation near sea level to or through a rocky-mountain elevation of 5,000 to 10,000 feet.

Turning to a description of the composition of the preferred crust, it should first be noted that the percentages used in the present specification to describe the pizza crust dough are generally "baker's percentages," which are weight percentages based on the weight of flour used in a specific recipe (generally per 100 pounds of flour). For example, for 100 pounds of flour in a recipe, 57 percent water and 1.5 percent salt would mean the addition of 57 pounds of water and 1.5 pounds of salt, respectively, to 100 pounds of flour. Of course, such baker's percentages do not normally add up to 100 percent. Conventional percentages can be calculated from baker's percentages by normalizing to 100 percent.

Baking science involves a complicated process employing time, temperature and relative humidity to produce various food products. The time, temperature and relative humidity parameters are generally different for bread, rolls, pizza crusts, pastry and cereal products, not only with regard to their appearance (crust color, size, etc.), but also with regard to the development and functioning of formula ingredients responsible for dough development, texture, and size. Some of the desirable changes caused by baking are protein denaturing, starch gelatinization, moisture migration and veracity (cell development or grain). Although many factors may be involved in preparing a baked product which is appealing in the eyes of the ultimate consumer, a manufacturer must also consider items such as shelf life and how a consumer will actually use a product. Consequently, it is desirable to have some quantitative measure by which one can determine whether a production line product meets specification. One such measure is water activity.

The breadstick products of the present invention will generally have water activities of about 0.9 to about 0.95 and preferably about 0.93. The water activity of the breadstick product is measured after the breadstick product has come out of the oven and cooled to about 100° F. For breadstick products of the present invention, the water activity may be measured within 24 hours after the fully baked breadstick product is removed from the baking oven, after the product is in the package. Moisture content of the breadstick product may be measured by after the crusts are packaged an $a_w$ meter or by weight difference between the crust after cooling to about 100° F. and after further, more complete drying (i.e., using a desiccator or other suitable and reliable method). Preferably, the moisture content of the fully baked breadstick product is about 83 to about 95 percent, and preferably in the range of about 90 to about 95 percent.

Since yeast is included in the formulation of the breadstick product, a fermentation or rising step is included in the dough preparation. The fermentation step allows the yeast to produce carbon dioxide gas which stretches and mellows the gluten contained in the flour, and aids in producing good flavor and texture. However, in large commercial baking operations such as will be used to prepare the breadstick products of the invention, fermenting all the dough to be baked requires large equipment outlays, is time consuming and is therefore costly. It has been found that in practicing the invention, one can produce a flavorful and texturally pleasing breadstick product by fermenting a portion of the dough and adding an aliquot of the fermented dough to bulk unfermented dough. The fermented dough is thoroughly mixed with the unfermented dough, the resulting mixture is divided, cut to size, shaped, and baked. In the time period from mixing to baking, the dough mixture continues to rise and develop the desired characteristics. It has been found that a dough mixture containing about 2 to about 7 percent fermented dough and about 93 to about 98 percent unfermented dough produces satisfactory results. One preferred mixture contains about 3 to about 5 percent fermented dough. Other preferred mixtures contain up to 10% fermented dough.

The texture of the baked breadstick product of the invention can be additionally altered by laminating the dough somewhat in the manner used to prepare croissants or Danish pastries. A laminate of three to six layers, preferably three to four layers, may be formed by folding the dough back-and-forth across itself (i.e., reworking). Lamination is believed to result in a baked product having improved texture and taste when cold or heated. The dough, whether laminated or not, is formed into the desired shape (e.g., see FIG. 1).

A basic recipe (in baker's percentages) for the breadstick product prepared according to the preferred embodiment of the invention will generally be as follows:

| Ingredient | Range (% flour basis) | Preferred Range (% flour basis) | Most Preferred (% flour basis) |
|---|---|---|---|
| Flour | 100 | 100 | 100 |
| Sweeteners | 7.0–17.0 | 10.0–14.0 | 12.0 |
| Salt | 1.5–3.5 | 2.0–3.0 | 2.5 |
| Dough Relaxer | 1.5–2.25 | 2.2–2.25 | 2.25 |
| Yeast | 0.5–5.0 | 3.0–4.0 | 3.5 |
| Shortening | 1.0–6.0 | 3.5–4.5 | 4.0 |
| Monoglycerides/ Diglycerides | 0.4–2.0 | 0.5–1.5 | 1.0 |
| Sodium Stearoyl Lactylate | 0–0.5 | 0.4–0.5 | 0.5 |
| Calcium Propionate | 0–0.5 | 0.4–0.5 | 0.45 |
| Alpha Amylase Enzyme | 0.2–0.4 | 0.3–0.35 | 0.32 |
| Guar Gum | 0–0.3 | 0.15–0.25 | 0.22 |
| Water | 51–59 | 53–59 | 57 |
| Spices/Seasonings | 0–7.0 | 4.25–6.0 | 5.3 |

In other embodiments, other ingredients might be substituted for those shown. For example, calcium stearoyl lactylate might be used in place of the sodium stearoyl lactylate. Other mold inhibitors could be used in place of or combined with, calcium propionate or an antimycotic coating might be applied instead. The flour is preferably hard wheat bread flour made from hard spring or winter wheat. The shortening is preferably a solid, hydrogenated or partially hydrogenated vegetable oil; for example, a hydrogenated or partially hydrogenated cottonseed, corn, soybean, sunflower, canola, or mixture thereof, and similar hydrogenated or partially hydrogenated vegetable oils and mixtures. The preferred vegetable oils are corn, canola, sunflower seed, cottonseed and soybean oils, or mixture thereof. The shortening may have a butter flavoring agent added to the shortening by the producer. Alternatively, a butter flavoring agent or other flavoring agent may be added to the recipe in an amount known to those skilled in the art or in accordance with the flavor manufacturer's recommendations. Compressed yeast may be substituted for the dried yeast used in the above basic recipe. If compressed yeast is used, the baker's percentage or weight is approximately doubled to account for the water content of the compressed yeast; likewise, the amount of water added may be reduced to account for the water content of the compressed yeast. Therefore, if compressed yeast is used in the above general recipe in place of dried yeast, the amount of compressed yeast will be in the range of about 1.0 to about 10.0 baker's percent, preferably about 6.0 to about 8.0 baker's percent.

The breadstick products can be assembled in any suitable packaging. Although the breadstick products of this invention may be packaged and sold as a stand alone product, it is generally preferred that they be included as part of a ready-to-eat kit. In such cases, the breadstick products are assembled in a package with other suitable components to form a kit from which a ready-to-eat breadstick product can be assembled. The kit typically comprises at least two baked breadstick products, preferably contained in one or two flexible pouches made of a plastic film (e.g., one pouch containing both breadstick products or two pouches each containing one breadstick product) and/or using compartments formed in the tray which are then sealed with a plastic film. The plastic films used for the pouches and the tray seal preferably comprise oxygen barrier layers. The other components can also be sealed in similar pouches, cups, or compartment form in the tray itself which can then be sealed. One especially preferred additional ingredient is cheese. Examples of the cheeses which may be included in the kit comprise mozzarella, Parmesan, Romano, Swiss, cheddar, Monterey jack, Gruyere, and similar cheeses.

The components comprising the ready-to-eat breadstick product kit are placed in a food package. If desired, components other than the just mentioned food products, can also be included in the kit. Such other components include, for example, a drink, dessert (e.g. candy), an implement or utensils, spices, napkins, and the like. Food packages of the type used for the ready-to-eat breadstick product kit of the invention have been described in the art such as, for example, U.S. Pat. Nos. 5,375,701 and 5,747,084, which are hereby incorporated by reference. As noted above, the food packages of the present invention do not require, and do not contain, the anti-fogging agents used in U.S. Pat. No. 6,048,558. FIG. 3 illustrates a type of packaging preferred for containing the components of a ready-to-eat breadstick product according to the invention. Those skilled in the art will recognize that similar types of packaging using greater or lesser numbers of compartments and/or greater or lesser numbers of packets containing the breadstick products and other components can be used in practicing the invention. Such similar types of packaging should not, however, contain the anti-fogging agents used in U.S. Pat. No. 6,048,558.

After assembling the breadstick product kit and in the embodiment of FIG. 4, sealing the top to the base tray, the kit is preferably stored at refrigeration temperatures. For use, the kit package is opened, the breadstick product and other components removed, and the various components assembled in any order the user may desire. The resulting breadstick product may be eaten as is or may be heated as recommended on the package or as desired by the consumer. Heating may be in a conventional or a microwave oven, microwave heating being preferable due to its speed. A recommended microwave heating time for a single loaf of three breadsticks at full oven power falls within the range of about 10 to about 80 seconds, and preferably within about 10 to about 15 seconds in order to preserve the taste, texture, and chewability characteristics of the breadstick product. To prevent excessive drying out of the product upon heating, it is generally preferred that the breadstick product be heated as an integral unit rather than as individual, separated breadsticks.

The following example is intended to illustrate the invention and not to limit or otherwise restrict the invention.

EXAMPLE

Preparation of Breadstick Product. A breadstick product was made using the following formulation:

| Ingredient | Amounts (% flour basis) |
| --- | --- |
| Flour | 100 |
| Sweeteners | 12.0 |
| Salt | 2.5 |
| Dough Relaxer | 2.25 |
| Yeast | 3.5 |
| Soybean Oil | 4.0 |
| Monoglycerides/Diglycerides | 1.0 |
| Sodium Stearoyl Lactylate | 0.5 |
| Calcium Propionate | 0.45 |
| Novamyl Enzyme | 0.32 |
| Guar Gum | 0.22 |
| Water | 57 |
| Spices/Seasonings | 5.3 |

The spices/seasoning component contained about 0.3 pounds of granulated garlic and about 5 pounds Greek seasoning on a 100 pound flour basis. All dry components were mixed using low speed mixing for about 1 minute, followed by the wet component which were mixed in using medium speed mixing for about 6 minutes. The resulting dough was then rolled into flat sheets, cut into 4.25 in. squares and shaped with a breadstick cutter to form the perforations (two per square). Each breadstick square contained about 56 to about 62 grams raw dough.

The breadstick squares were proofed at about 85 percent relative humidity and about 110° F. Proofing was carried out for about 20 to about 25 minutes; satisfactory proofing can be determined when the breadsticks stay indented when pressed lightly with a finger. After proofing, the proofed breaded square was baked at about 400° F. commercial oven for about 3 to about 4 minute to yield a breadstick product that was fully baked and had a golden brown color.

Preferably, the baked breadstick product is immediately frozen using a −20° F. blast freezer. The breadstick product is then packaged in a film pouch or bag using vacuum and then flushing with nitrogen before sealing. Each film pouch or bag contains one or two breadstick products, thus having three to six individual breadsticks if separated.

Preferably, the breadstick products are kept frozen until offered for retail sale to maximize the product life. The breadstick products may be sold alone or packaged with additional food products as illustrated in FIG. 3.

We claim:

1. A kit for making breadstick products, said kit comprising a carton, at least one fully baked farinaceous breadstick loaf; and one or more other food components; a plurality of containers to hermetically seal the breadstick loaf and the one or more other food components from atmosphere external of the containers; wherein the at least one fully baked breadstick loaf has a water activity in the range of about 0.9 to about 0.95; wherein the breadstick loaf has at least one perforation to allow the breadstick loaf to be easily separated by hand to form at least two individual breadsticks; wherein the breadstick is prepared from a dough comprising, in baker's percentages, about 100 pounds flour, about 7.0 to about 17.0 pounds sweetener, about 1.5 to about 3.5 pounds salt, about 1.5 to about 2.25 pounds dough relaxer, about 0.5 to about 5.0 pounds yeast, about 1.0 to about 6.0 pounds shortening, about 0.4 to about 2.0 pounds monoglycerides and diglycerides, about 0 to about 0.5 pounds sodium stearoyl lactylate, about 0 to about 0.5 pounds calcium propionate, about 0.2 to about 0.4 pounds Alpha amylase enzyme, about 0 to about 0.3 pounds guar gum, about 51 to about 59 pounds water, and about 0 to about 7.0 pounds spices and seasonings; and wherein water activity of the fully baked breadstick loaf can be maintained at about 0.9 to about 0.95, when hermetically sealed and stored at refrigeration temperatures, for periods of at least 3 months without the use of an anti-fogging agent.

2. The kit as defined in claim 1, wherein the breadstick loaf and each of the other food components are hermetically sealed in individual packages under an inert atmosphere or under inert gas flushed conditions.

3. The kit as defined in claim 1, wherein the breadstick loaf is hermetically sealed in an individual package under an inert atmosphere or under inert gas flushed conditions.

4. The kit as defined in claim 1, wherein the other food component is selected from the groups consisting of pizza sauce, cheese, cheese products, cheese sauces, tomato sauces, cream cheese, butter, margarine, jam, jelly, honey, peanut butter, olive oil, salad ingredients, and salad dressings in separate compartments, and wherein the food components are hermetically sealed from each other under an inert atmosphere or under inert gas flushed conditions.

5. The kit as defined in claim 1, wherein the kit contains at least two other food components selected from the groups consisting of pizza sauce, tomato sauce, cheese, soft drinks, cheese products, cheese sauces, tomato sauces, cream cheese, butter, margarine, jam, jelly, honey, peanut butter, olive oil, salad ingredients, and salad dressings and wherein the components are hermetically sealed from each other compartments under an inert atmosphere or under inert gas flushed conditions.

6. The kit as defined in claim 4, wherein the other component is a cheese selected from the group consisting of mozzarella, Parmesan, Romano, Swiss, cheddar, Monterey jack and Gruyere.

7. The kit as defined in claim 1, wherein the water activity of the fully baked breadstick loaf is about 0.93.

8. The kit as defined in claim 1, wherein the breadsticks are prepared from a dough formula comprising, in baker's percentages, about 100 pounds flour, about 10.0 to about 14.0 pounds sweetener, about 2.0 to about 3.0 pounds salt, about 2.2 to about 2.25 pounds dough relaxer, about 3.0 to about 4.0 pounds yeast, about 3.5 to about 4.5 pounds shortening, about 0.5 to about 1.5 pounds monoglycerides and diglycerides, about 0.4 to about 0.5 pounds sodium stearoyl lactylate, about 0.4 to about 0.5 pounds calcium propionate, about 0.3 to about 0.35 pounds Alpha amylase enzyme, about 0.15 to about 0.25 pounds guar gum, about 53 to about 59 pounds water, and about 4.0 to about 6.0 pounds spices and seasonings.

9. A fully baked breadstick product comprising a fully baked breadstick loaf having perforations formed during baking which allow the fully baked breadstick loaf to be easily separated by hand to form individual breadsticks; wherein the fully baked breadstick loaf has a water activity of about 0.9 to about 0.95; wherein the fully baked breadstick loaf is prepared from bread dough comprising, in baker's percentages, about 100 pounds flour, about 7.0 to about 17.0 pounds sweetener, about 1.5 to about 3.5 pounds salt, about 1.5 to about 2.25 pounds dough relaxer, about 0.5 to about 5.0 pounds yeast, about 1.0 to about 6.0 pounds shortening, about 0.4 to about 2.0 pounds monoglycerides and diglycerides, about 0 to about 0.5 pounds sodium stearoyl lactylate, about 0 to about 0.5 pounds calcium propionate, about 0.2 to about 0.4 pounds Alpha amylase enzyme, about 0 to about 0.3 pounds guar gum, about 51 to about 59 pounds water, and about 0 to about 7.0 pounds spices and seasonings; and wherein water activity of the fully baked breadstick loaf can be maintained at about 0.9 to about 0.95, when hermetically sealed and stored at refrigeration temperatures, for periods of at least 3 months without the use of an anti-fogging agent.

10. The fully baked breadstick loaf as defined in claim 9, wherein the breadstick loaf is about 3.5 to about 6.0 in. long, about 2.5 to about 5 in. wide, and about 0.5 to 1.0 in. thick; and where the breadstick loaf has two perforations along its length so that it can be easily separated by hand into three breadsticks.

11. The fully baked breadstick loaf as defined in claim 9, wherein the breadstick loaf is about 4 to about 4.5 in. long, about 3.5 to 4.0 in. wide, and about 0.7 to 0.8 in. thick; and where the breadstick loaf has two perforations along its length so that it can be easily separated by hand into three breadsticks of about 4 to 4.5 in. long, about 1.2 to about 1.5 in. wide, and about 0.7 to about 0.8 in. thick.

12. The fully baked breadstick loaf as defined in claim 9, wherein the breadstick loaf is prepared from bread dough comprising, in baker's percentages, about 100 pounds flour, about 10.0 to about 14.0 pounds sweetener, about 2.0 to about 3.0 pounds salt, about 2.2 to about 2.25 pounds dough relaxer, about 3.0 to about 4.0 pounds yeast, about 3.5 to about 4.5 pounds shortening, about 0.5 to about 1.5 pounds monoglycerides and diglycerides, about 0.4 to about 0.5 pounds sodium stearoyl lactylate, about 0.4 to about 0.5 pounds calcium propionate, about 0.3 to about 0.35 pounds Alpha amylase enzyme, about 0.15 to about 0.25 pounds guar gum, about 53 to about 59 pounds water, and about 4.0 to about 6.0 pounds spices and seasonings.

13. The fully baked breadstick loaf as defined in claim 10, wherein the breadstick loaf is prepared from bread dough comprising, in baker's percentages, about 100 pounds flour, about 10.0 to about 14.0 pounds sweetener, about 2.0 to about 3.0 pounds salt, about 2.2 to about 2.25 pounds dough relaxer, about 3.0 to about 4.0 pounds yeast, about 3.5 to about 4.5 pounds shortening, about 0.5 to about 1.5 pounds monoglycerides and diglycerides, about 0.4 to about 0.5 pounds sodium stearoyl lactylate, about 0.4 to about 0.5 pounds calcium propionate, about 0.3 to about 0.35 pounds Alpha amylase enzyme, about 0.15 to about 0.25 pounds guar gum, about 53 to about 59 pounds water, and about 4.0 to about 6.0 pounds spices and seasonings.

14. The fully baked breadstick loaf as defined in claim 9, wherein the breadstick loaf is prepared from bread dough comprising, in baker's percentages, about 100 pounds flour, about 12.0 pounds high fructose corn syrup, about 2.5 pounds salt, about 2.25 pounds dough relaxer, about 3.5 pounds yeast, about 4.0 pounds shortening, about 1.0 pounds monoglycerides and diglycerides, about 0.5 pounds sodium stearoyl lactylate, about 0.45 pounds calcium propionate, about 0.32 pounds Alpha amylase enzyme, about 0.22 pounds guar gum, about 53 to about 59 pounds water, about 0.3 pounds granulated garlic, and about 5.0 pounds Greek seasoning.

15. The fully baked breadstick loaf as defined in claim 10, wherein the breadstick loaf is prepared from bread dough comprising, in baker's percentages, about 100 pounds flour, about 12.0 pounds high fructose corn syrup, about 2.5 pounds salt, about 2.25 pounds dough relaxer, about 3.5 pounds yeast, about 4.0 pounds shortening, about 1.0 pounds monoglycerides and diglycerides, about 0.5 pounds sodium stearoyl lactylate, about 0.45 pounds calcium propionate, about 0.32 pounds alpha amylase enzyme, about 53 to about 59 pounds water, about 0.3 pounds granulated garlic, and about 5.0 pounds Greek seasoning.

* * * * *